April 12, 1966   J. W. TREAT ETAL   3,245,824
PROCESS AND APPARATUS FOR COATING THE INSIDE OF PIPE
Filed Oct. 12, 1961   4 Sheets-Sheet 1

INVENTORS
JOSEPH W. TREAT
LOUIS A. PAVLISH
ALBERT J. PREDOTA
BY
THEIR ATTORNEY

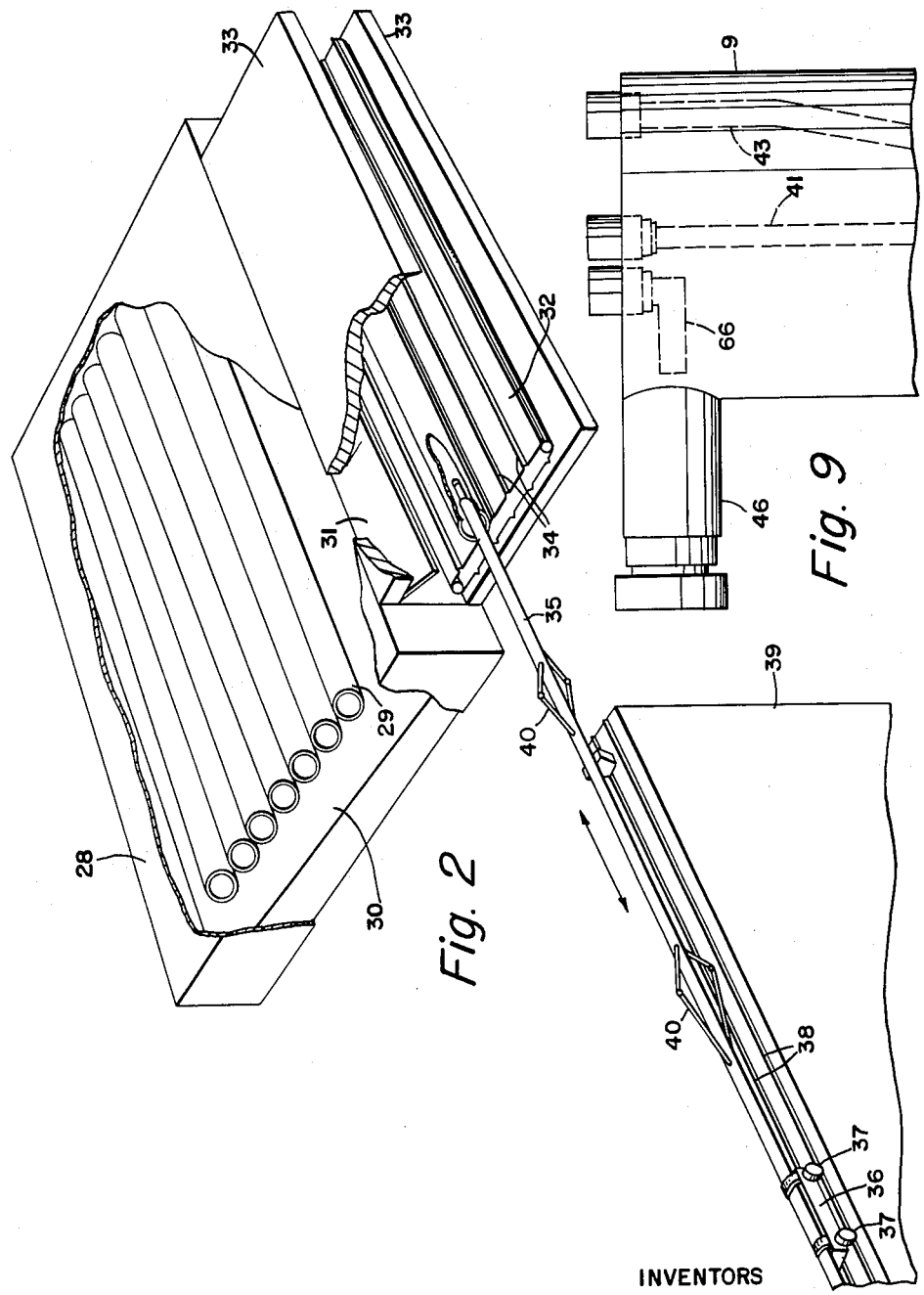

INVENTORS
JOSEPH W. TREAT
LOUIS A. PAVLISH
ALBERT J. PREDOTA
BY

THEIR ATTORNEY

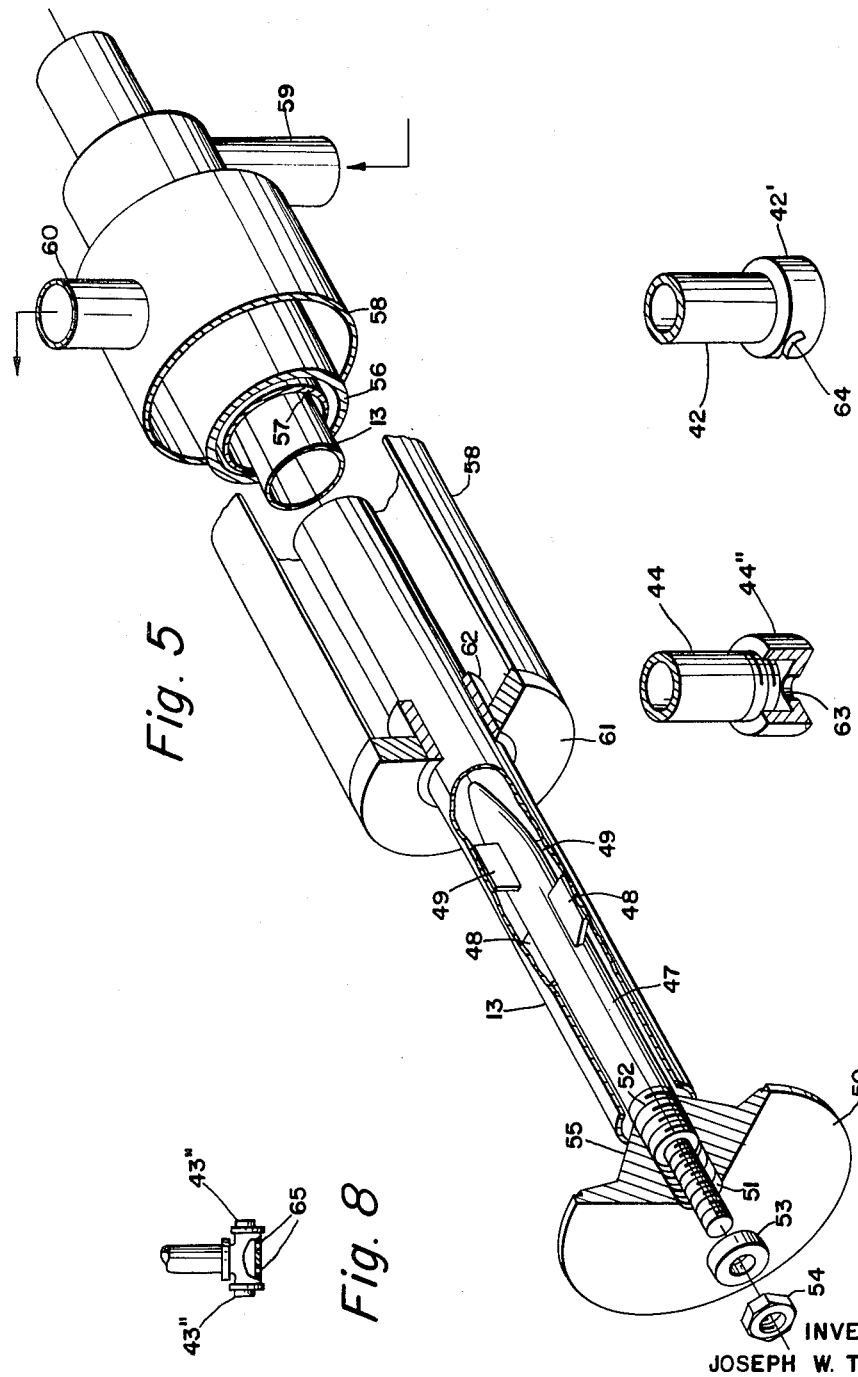

United States Patent Office 3,245,824
Patented Apr. 12, 1966

3,245,824
PROCESS AND APPARATUS FOR COATING
THE INSIDE OF PIPE
Joseph W. Treat, Cleveland, Louis A. Pavlish, Independence, and Albert J. Predota, Cleveland, Ohio, assignors to Republic Steel Corporation, Cleveland, Ohio, a corporation of New Jersey
Filed Oct. 12, 1961, Ser. No. 144,631
18 Claims. (Cl. 117—18)

This invention relates to a process for the application of a resin coating to the inside of pipe. More specifically, it relates to a process for the spraying of finely-divided resin particles onto the inside surface of heated pipe, and apparatus for such application.

Various methods for applying a resin coating to the inner surface of pipe have been proposed. However, these have been found to have certain defects or disadvantages with regard to commercial production. For example, it has been suggested that molten resin or a resin solution or suspension be held in contact with the inner surface of the pipe while the pipe is revolved about its axis so as to effect a coating of the pipe. However, the use of molten resin requires temperature control difficult to maintain for obtaining the desired thickness of resin and freedom from holidays, e.g. bare spots or pin holes in the coating. This technique is also limited to the use of thermoplastic resins since thermosetting resins are cured by the heating operation.

With a solution or a suspension of resin, the removal of the solvent or the suspending medium results in the formation of bubbles or openings in the resultant coating. Moreover, the complete removal of solvent and hardening of the resultant coating to give proper strength and adhesion requires a treating period and conditions which are commercially disadvantageous. Furthermore, it is generally necessary to apply several such coatings in order to obtain a desired thickness.

To avoid the removal of solvent or suspending medium, it has been proposed that a resin powder be blown into the inside of the pipe. However, the methods of blowing resin powder onto the interior surfaces of the pipe involve numerous problems in obtaining uniform coating of the powder and freedom from holidays in the coating. Moreover, it has been found difficult to obtain a resin coating free of holidays without having to apply a thickness of resin greater that is otherwise desired and sometimes economically feasible.

In accordance with the present invention, it has been found possible to apply a satisfactory coating of either thermoplastic or thermosetting resin to the inside surface of pipe to give a uniform coating free from holidays and to give the desired thickness in a single pass with the resin powder spraying equipment and process described herein which applies the resin powder in a stream of air to the surface of heated pipe.

The apparatus of this invention comprises a hopper for feeding the resin powder into a dust chamber, a dust chamber having at least one fluffing jet, preferably at least two fluffing jets located in the lower portion of the dust chamber, and at least one jet located near the top of the chamber, a lance connected to the dust chamber, preferably through a collecting head at the top of the dust chamber, the lance being of sufficient length to reach the desired distance into the pipe to be coated and being equipped with a means to prevent the inner part of the lance from becoming heated by radiation from the pipe, and the lance having a spray nozzle at the end thereof farthest removed from the dust chamber, this spray nozzle being adapted to spray a uniform coating of resin powder over the inner surface of the pipe into which the lance is inserted, and a means for relative advancement of the lance into and out of the inside of the pipe.

In the drawings:

FIG. 2 shows a perspective view of another modification wherein the pipe to be coated remains stationary and the lance together with the collecting head and dust chamber (not shown) move on a guiding track in such a manner that the lance is advanced into the interior of the pipe.

FIG. 5 is a perspective view of the spray nozzle and adjoining end of the lance, showing in broken section the assembly of the nozzle and the water jacket arrangement of the lance.

FIGS. 6, 7 and 8 are detailed views showing particular designs of jet openings.

FIG. 9 shows a side view of the collector head in which an auxiliary jet has been inserted for boosting the velocity of the dust cloud.

Figure 1:
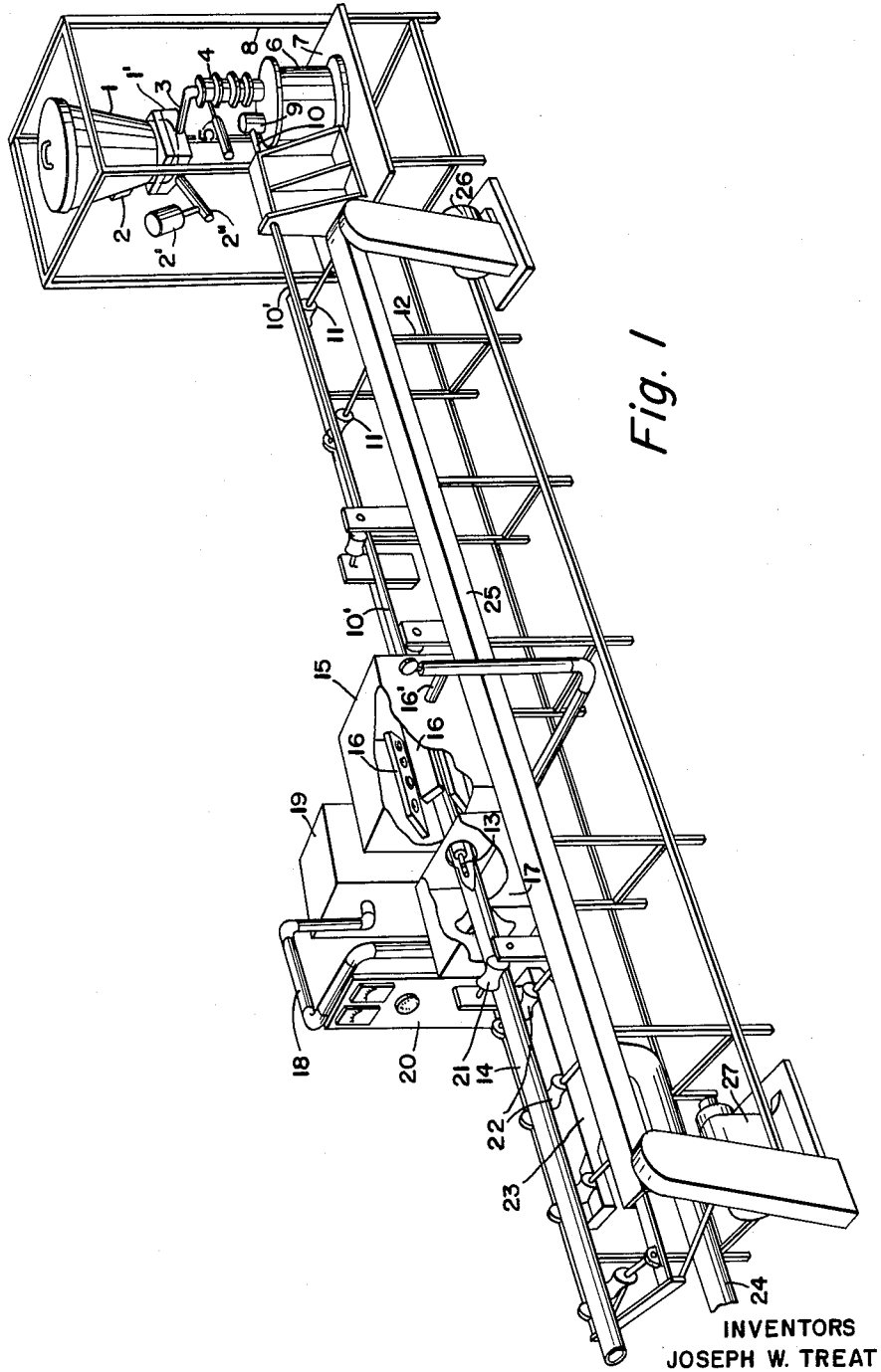
FIG. 1 is a perspective view of one modification of the apparatus of this invention showing a roller means for conveying pipe onto a stationary spraying lance which is fed resin powder through a collecting head from a dust chamber.

In the practice of this invention, it has been found essential that the resin powder in the dust chamber be kept in a suspended state or in such a condition that a cloud of dust is carried by a stream of air out of the dust chamber and through the lance. In order to maintain this suspension of dust in a cloud of sufficient density to give the coating results desired, it has been found necessary to have at least one fluffing jet, preferably at least two such fluffing jets in the lower portion of the dust chamber. By keeping the powder in a fluffed condition, a cloud of dust is maintained by the air from the roof jet or roof jets located in the upper portion of the dust chamber and carried out by the stream of air passing out of the dust chamber.

While the optimum number of fluffing jets and roof jets depends on a number of factors such as the size of the dust chamber, the desired rate of dust throughput, the particle size and density of the dust being used, etc., it is generally desirable for commercial use to have at least one roof jet and at least one fluffing jet, preferably at least two fluffing jets to insure that the resultant coating is uniformly applied and free from holidays. The greater the diameter and height of the dust chamber, the greater will be the number of fluffing jets required to maintain the dust in a loosened state suitable for forming the dust cloud with the air from the roof jets.

In some cases a chamber may be used having a depth greater than actually required with the excessive depth being filled by a dead bed of powder. In such case, for descriptive purposes, the top of this dead bed might actually be regarded the effective bottom of the dust chamber. Therefore, when reference is made to the fluffing jets being located in the lower third of the dust chamber or near the bottom of the dust chamber, it actually might be, in a case where the chamber is of exceptional depth and the lower half or more of the actual chamber is filled with a dead bed of powder, that the fluffing jets extend into the lower third of the "effective" depth of the dust chamber. In such cases the effective depth of the dusting chamber can be regarded as the depth to which the powder is kept in movement by the fluffing jets. In any case the distance between the lower end of the fluffing jets and the lower end of the roof jets is desirably at least half of the effective depth of the chamber. It is also desirable that the respective fluffing jets be spaced apart from each other, and also that the roof jets be spaced apart from each other so as to obtain the maximum efficiency from the air coming through these jets. However, even though the respective jets are placed close to each other, the greater volume of air coming through two jets as compared to the volume of air from a single jet has a more advantageous effect than would be obtained from a single jet.

Various means can be used for feeding the powder to the dust chamber. However, it has been found advantageous to use a cone type hopper equipped with a vibrator to keep the powder in motion. The hopper feeds a charge periodically into a charging cylinder located above the dust chamber. The charge is dropped through the charging cylinder into the dust chamber in the period between spraying operations e.g. while the pipe is being advanced over the lance. While sufficient charge can be added at each charging operation to accommodate a number of spraying operations, it has been found advantageous to charge each time the amount used in each spraying operation. This avoids variations in the amount of powder contained in the dust chamber from one spraying operation to another. In this way the conditions of the dust chamber are maintained as uniformly as possible from one spraying operation to another. While the size of the dust chamber can be made large enough to accommodate enough powder for a number of spraying operations without affecting too greatly the level of powder and other conditions in the dust chamber, it is generally found just as practical, even with larger size dust chambers, to have each charge correspond to the amount used in each spraying operation.

In the travel of the lance into and out of the pipe, or in the alternate operation of the pipe travelling onto and then withdrawing from the lance, the nozzle-bearing end of the lance can be supported by one or more wheels attached to the underside of the lance which ride upon the bottom inner-surface of the pipe and also guide wheels can be located at the sides of the lance which space the center line of the lance at approximately the axis of the pipe. The positions of these wheels will be adjusted according to the internal diameter of the pipe being coated.

In order to avoid having these wheels travel over freshly applied coating, the spraying operation is performed on the withdrawal stroke. Regardless of whether the pipe is moved onto the stationary lance, or the lance is moved forward into a pipe in a stationary position, the term "advancing stroke" is used herein to indicate the relative movement of the lance with respect to the pipe by which the lance is inserted or positioned within the pipe. Likewise, the term "withdrawal stroke" is used herein to indicate the relative movement of the pipe and lance by which the lance is withdrawn from the inner region of the pipe.

The nozzle used in spraying the inside of the pipe comprises a deflector plate, positioned perpendicularly to the linear axis of the lance and also to the linear axis of the pipe, which presents a curved or straight angular surface in the path of the air-resin powder stream being fed through the lance. The deflecting or angular surface can actually be a conical surface with the base of the cone perpendicular to the axis of the lance and the apex of the cone extending into the interior of the lance. The conical surface can be straight or curved in the sense that a vertical cross-section represents either a triangle or a figure having a straight base and two curved lines extending from the two ends of the base line and meeting at the apex. This angular surface deflects the resin particles and directs them against the inner side of the heated pipe.

Various means can be used for heating the pipe to the desired temperature for obtaining the fusion or curing of the resin particles. This can be done by radiant heaters of various types while the pipe is being advanced onto the lance, or as the pipe is held in a stationary position while the lance is being advanced into the pipe. Alternately the entire heating operation can be effected before the pipe is placed in position for the spraying operation, or the pipe can be partially heated before positioning and the heating completed during the advancing stroke. In such preliminary heating, almost any type of arrangement for heating the pipe can be used. Moreover, any number of such pipes can be stored in a heating chamber at the desired temperature and removed at the appropriate time for the spraying operation.

Means are used to protect the lance from heat radiated from the pipe. The degree of protection necessary depends upon the particular type of operation and the resulting conditions. In cases where the lance is a stationary type and heat is applied to the pipe as it is moved onto the lance, there is a greater need for such protection since the lance remains in the heating zone. In other cases where the heat is applied to the pipe in a zone separate from that in which the lance is located, more moderate protective means can be used such as an air-cooled jacket. In some cases depending upon the rate of air flow through the powder tube, there is even sufficient cooling provided merely by the flow through the powder tube. In most cases, however, a water-cooled jacket is provided running substantially the length of the lance, thus preventing any substantial increase in temperature in the air-powder stream passing through the inside of the lance. The relatively low temperature of the air-powder stream also serves to keep the deflecting plate and the nozzle at a sufficiently low temperature as to prevent fusion or sticking of the resin powder to the deflector plate. The outside jacket of the lance is likewise maintained at sufficiently low temperature by the water, or in the case of an air jacket by the air passing therethrough, so as to prevent any substantial sticking of the resin on the outer surface of the lance.

Since the deflector plate generally has a greater diameter than the lance, the greater portion of the air emanating from the lance is deflected backward in the general direction from which the air is advancing through the lance. However, air from this stream is exhausted from both ends of the pipe, the relative proportion depending upon the comparative obstruction offered by the deflector plate and by the thickness of the lance to the flow of air between each of these objects and the inner wall of the pipe. However, by the time the air is exhausted from either end of the pipe, substantially all of the resin particles have been deposited on the inner surface of the pipe. This exhausted air can be drawn by suction into a dust recovery system for recovery or disposal of the dust particles.

The invention is best illustrated by reference to the drawings.

In FIG. 1, hopper 1 is supported by cables (not shown) and is vibrated by vibrator 2 so that powder contained in the hopper is fed into hopper base 1' and then into feed pipe 3 which leads into charging cylinder 4. A second vibrator 2' is attached through spring 2" to hopper base 1'. A butterfly valve in charging cylinder 4 is operated periodically by air cylinder 5. When this valve is opened operation of vibrators 2 and 2' causes movement of the powder from hopper 1, through pipe 3 and into charging cylinder 4. The charging cylinder 4 feeds the resin dust or powder into dust chamber 6.

In the particular equipment shown in FIG. 1, the charge is measured by controlling the time during which the vibrators on the hopper are operated. By prior determination of the rate at which powder is discharged from the hopper during operation of the vibrators, it is possible to control the amount of powder passing into the charging cylinder in accordance with the time that the vibrators are operated. Obviously the rate will change according to the particular design of the hopper, the type of vibrators used and the characteristics of the powder itself. Therefore, the particular system is necessarily calibrated. This is easily done by operating the vibrators with a particular hopper using a particular powder and determining the rate at which the powder is delivered. Then the time for operating the vibrators is selected in accordance with the desired amount of powder to be added in each charge. Then when a charge is to be added, the butterfly valve is opened and the vibrators turned on until the desired charge has been added.

In FIG. 1 the various air jets are not shown. The dust chamber rests on supporting stand 7 which in turn is supported by frame 8. At the top of the dust chamber, collecting head 9 connects the dust chamber with lance 10. Lance 10 extends to the left and is shown as jacketed sections 10′. The lance extends over a number of rolls 11 which in turn are supported by supporting stand 12. The powder tube 13 of the lance is shown in broken section through pipe 14. In this view the deflector plate construction is not shown, nor is the supporting wheel which spaces the lance from the bottom of the pipe.

Both the lance and the pipe extend through heating chamber 15 in which heat is applied to the pipe by radiant heaters 16. Heat is generated in these radiant heaters by a gas-air mix fed through line 16′. Dust hood 17 is connected by vent pipe 18 to dust collector 19. Control panel 20 operates the vibrator 2. Pinch roll 21 provides positive drive means for advancing and withdrawing the pipe 14. The pipe is supported initially by rollers 22 and after passing through the heating chamber, is supported by positively driven rollers 11. A suction draft in dust and fume collector 23 sucks air through air suction pipe 24 which is connected to a fan and filter for removing dust and venting filtered fumes to the outside atmosphere. Housing 25 covers a sprocket chain (not shown) which drives the supporting rolls 22 and 11. This sprocket chain is driven by motor 26 during the advancing stroke and is driven by motor 27 during the withdrawal stroke.

FIG. 2 shows a heating chamber 28 with the broken section showing the arrangement of pipe 29 therein maintained on an inclined surface and eventually released by releasing the restraining means and allowing the pipe to roll down runway 31 onto the supporting endless belt 32 and be positioned for the subsequent spraying operation.

Heat can be supplied to the pipe in the heating chamber by various means. In this particular arrangement, burning gases are fed into a lower region of the heating chamber and the pipes are heated by contact with and heat radiation from the surface of the chamber which supports the pipes. The housing 33 which covers and supports endless belt 32 is insulated to retard heat loss from the pipe during the period the pipe is retained on the endless belt. Ridges 34 on the endless belt restrict movement of the pipe and provide an arrangement whereby a plurality of pipes can be positioned on the endless belt and simultaneously sprayed by having a plurality of lances advance into the plurality of pipes.

In this view, a single movable lance 35 is shown supported by cart 36 whose wheels 37 are guided by tracks 38 on supporting base 39, so that the lance is advanced in a straight path into the pipe. A number of such supporting means and parallel guiding tracks can be provided so that a plurality of such lances can be inserted into a number of pipes supported on the endless belt 32.

Spacers 40 are provided to keep the lance in the middle of the pipe. In FIG. 1 a supporting wheel was described to serve a similar purpose. Although not shown in this view, the hopper, dust chamber, collecting head, etc., described in connection with FIG. 1 are mounted on a movable truck and are likewise moved forward and backward in accordance with the advancing and withdrawing operations of the lance. In operating with a plurality of lances as described above, a single hopper and dust chamber arrangement can be adapted to serve a number of lances or individual hoppers and dust chambers can be provided for each such lance.

Figure 3:
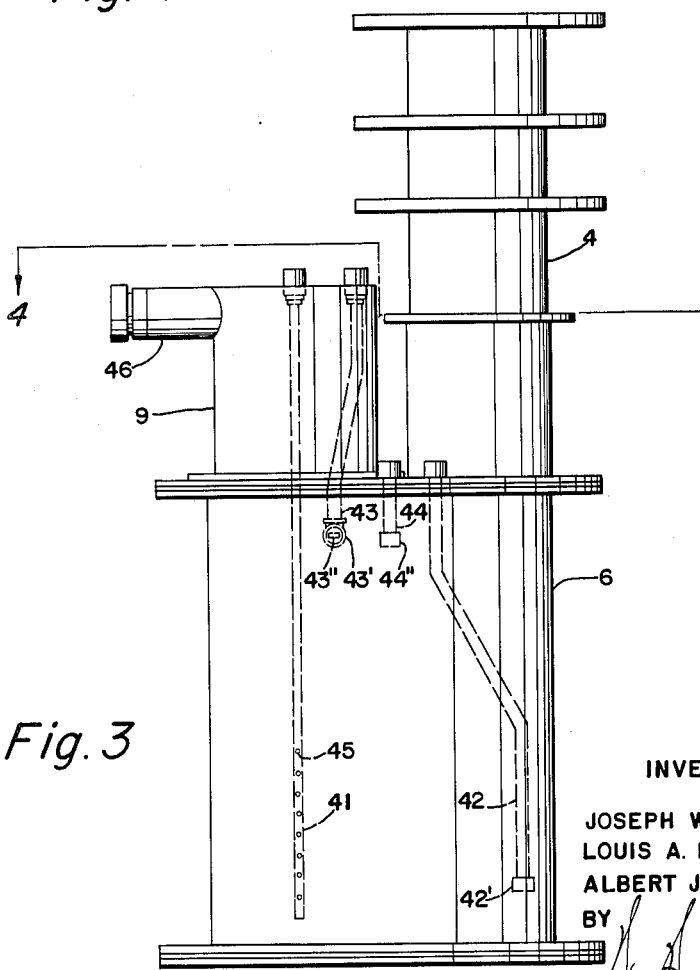
FIG. 3 shows an elevation view of the dust chamber with a collecting head at the top and with two lower fluffing jets and a plurality of roof jets.

FIG. 3 shows the construction of dust chamber 6 with charge inlet means 4 and collecting head 9 attached thereto. Fluffing jet 41 is shown extending almost to the bottom of the dust chamber and fluffing jet 42 also extending almost to the bottom of the dust chamber but spaced on the opposite side of the dust chamber from fluffing jet 41. Fluffing jet 41 extends down through collecting head 9 whereas the cap 42′ of fluffing jet 42 is positioned under charge measuring means 4. Fluffing jet 42 is an angular pipe with the top end fastened at one side and as indicated in the top view shown in FIG. 4, extends at an angle so that the cap 42′ is positioned below the charge measuring inlet 4. This arrangement is made so as to have the fluffing jet positioned below the inlet means for the charge without having the pipe come down through the charging means.

Figure 4:
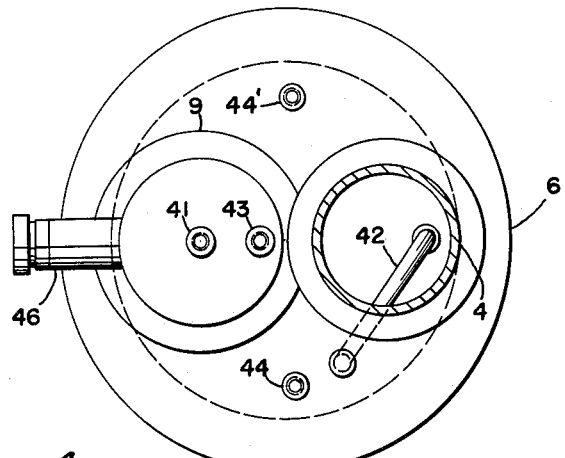
FIG. 4 shows a top view of the apparatus shown in FIG. 3.

One roof jet 43 is shown coming down through collecting head 9, and two other roof jets 44 and 44′, positioned on opposite sides as shown in FIG. 4, come through the roof of the dust chamber.

Roof jet 43 has a T 43′ at the end thereof with plugs 43″ inserted at each end of the T and at the bottom of the T two holes 65 are drilled so that two jets of air pass directly downward, as shown in greater detail in FIG. 8. Roof jet 44 has a cap 44″ at the end thereof with an opening drilled at the bottom as shown in greater detail in FIG. 6, so that a jet of air passes directly downward. In fluffing jet 41, in addition to the openings shown in the sides of the tube, the end of the tube is plugged and a hole drilled through this plug. If desired, a large opening can be provided in the end of the tube as a substitute for the plurality of openings and thereby provide an equivalent amount of air flow to effect the fluffing. Fluffing jet 42 has a cap 42′ at the end thereof with a slot opening at the side facing toward the center of the dust chamber. This is shown in greater detail in FIG. 7. Obviously, other types of openings can be provided in the various jets to direct the air flow in whatever direction is desired. Connecting pipe 46 is aligned with the lance and connects the collecting head with the lance.

FIG. 4 is a top view of the apparatus shown in FIG. 3, taken at line 4—4 of FIG. 3.

FIG. 5 shows by broken sections, the construction of the lance and the spraying nozzle. Stem 47 is held tightly in position on the inside of powder tube 13 by horizontal ribs 48 and vertical ribs 49 which fit snugly against the inner wall of powder tube 13. The diameter of stem 47 is designed to provide sufficient space for air flow between the stem and the inner wall of the powder tube. The gap between the stem and the inner wall is advantageously in the range of $1/16$ to $1/2$ inch, preferably about $1/8$ inch.

Deflector plate 50 is fastened onto stem 47 by threads in the opening 51 which fit onto threads in the threaded portion 52 of the stem 47. The position of the deflector plate with respect to the end of the powder tube can be adjusted by turning the deflector plate and advancing it or retracting it on the threaded section as desired. Once the deflector plate is positioned properly, washer 53 is positioned on the threaded end and bolt 54 is fitted onto the threaded portion and tightened against the washer and deflector plate. Angular portion 55 is designed to cause the air-dust stream to be deflected toward the inner side of the pipe into which the lance is inserted. The angle or curvature of section 55 can be designed according to the size of the pipe and the particular effects desired in deflecting the air-powder stream.

In the jacketed section shown in FIG. 5, tubular walls 56, 57 and 58 provide passageways for flow of cooling water to prevent the powder tube 13 from being heated by radiation from the pipe in which the lance is inserted. Water is fed into water inlet 59 and passes between walls 56 and 57 to the end of the jacketed section where one or more openings in wall 56 permit flow of the water into the space between walls 56 and 58 and thereafter to water outlet 60. Wall 61 supports the outer tube 58 and spacer means 62 serves to hold the powder tube in the center of tube 57. The end of each of the tubes 56, 57 and 58 is welded to wall 61.

FIG. 6 shows by partial cross-section the construction of cap 44" of roof jets 44 and 44' and the jet opening 63.

FIG. 7 shows in greater detail the cap 42' of fluffing jet 42 and shows the slotted opening 64.

FIG. 8 shows a side view of the T 43' on the end of roof jet 43 and by partial cross-section shows the two jet openings 65 on the bottom thereof.

FIG. 9 shows a booster jet 66 located in the collecting head 9 directing a stream of air in the direction of the connecting pipe 46 for the purpose of increasing the velocity of the dust cloud.

The apparatus and process of the invention are suitable for applying any resin powder which is capable of being fused or cured by the application of heat. With thermoplastic powders, which are not curable by the application of heat, the resin is merely fused and the temperature of the pipe controlled so that the desired temperature for fusion is maintained at the time of application and during or shortly after the application there is enough temperature drop to effect solidification.

Typical resins that can be used for this purpose include, but are not restricted to, heat-curable epoxy resins, including various modified epoxy resins, polyethylene, polyvinyl butyrates, polyacrylates, acrylic polymers modified with melamine or epoxy resins, methyl methacrylate polymers modified with solid butylated melamine, and various other vinyl type resins, nylons, etc. In fact, any resin that will soften and adhere to heated metal can be used.

As indicated above, it is essential for the practice of this invention that there be at least one roof jet and one fluffing jet, preferably at least two fluffing jets. The roof jets are located within the upper half of the dust chamber, preferably within the upper third of the chamber, and the fluffing jets are located within the lower third of the chamber. It is generally desirable to have the lower jets or fluffing jets at such a low point that when the compressed air is turned off, the powder will settle at a level above the lowest opening of the fluffing jet. The air being fed into the jets in the upper half of the dust chamber is fed at a pressure of 10–60 lbs. per square inch.

With increase in the size of the pipe to be coated, an increase in the number of pipe to be coated, an increase in the rate of coating, etc., an increase in the size of the dust chamber will accordingly be required. This will also require an increase in the number of jets required in the operation of the dust chamber.

The particle size of the resin powder to be used will depend on the particular resin, the size of the particle which can be easily suspended in an air stream and a size of particle which can be easily and quickly fused by the temperature of the pipe. For example, a commercially available heat-curable epoxy resin used in the example described hereinafter are particles of a size such that 0.3 percent by weight is retained on a Tyler sieve of size 100, 15.9 percent by weight is retained on a sieve of size 150; 70.3 percent by weight is retained on sieve size 200 and 13.5 percent by weight is collected on the pan.

It is generally desirable to have a velocity in the range of 2000–8000 ft./min. depending on the particular powder in order to keep the resin particles in suspension through the lance. Generally a rate of about 4000 feet per minute is satisfactory. Obviously, this critical velocity will vary according to the density and particle size of the powder.

In operating the dust chamber, it is desirable to have an air pressure of 10–120 pounds, preferably 10–75 pounds per square inch. Generally 10–30 p.s.i. is satisfactory on the fluffing jets for maintaining a cloud of resin powder in the dust chamber. It is found that such pressures maintain the dust powder in a suspended state for a distance of 6–8 inches from the jet opening. Therefore, as the diameter of the dust chamber is increased, it is desirable to have a larger number of fluffing jets so as to keep the resin dust loosened throughout the entire area of the dust chamber.

Generally the air pressure on the jets is adjusted to give the measure of air desired to effect the carrying of the desired amount of powder for coating. The volume of air for this purpose is in the range of about 10–120 cubic feet per minute.

In some cases, the dust may be so well maintained in a cloud formation, or the fluffing of the dust so efficiently promoted, that it may be desirable to have the velocity of the cloud increased by the use of a roof jet directed toward the lance opening as shown in FIG. 9. The use of this booster jet can be made optional according to the conditions of the suspended cloud. This jet does not operate as an atomizer since it can be set back from the opening and there is no suction effect promoted by the direction of this jet into the connecting pipe which leads to the lance. This jet functions more for increasing the rate of flow of the cloud of dust particles.

It has been found desirable to deposit a resin coating of approximately 6–10 mils, preferably about 7–9 mils. Such a thickness can be obtained by the process and equipment of this invention with substantially no holidays.

While the temperature at which the pipe is desirably maintained for the practice of this invention will vary according to the particular resin being used, it has been found that a temperature of 375–450° F. is generally suitable for most purposes. The pipe should be clean and free of scale, rust, dirt and grease. Therefore, a preliminary cleaning treatment is desirable such as alkaline cleaning and acid pickle. However, any method that will produce a clean, oxide-free surface is suitable.

In order to illustrate the process and method of operating the apparatus of this invention, the following procedure is described merely for purposes of illustration. It is not intended that the scope of the invention or the manner of practicing the same is in any way limited by this description. In operating equipment as shown generally in FIG. 1, using pipe of 2 and 7/8 inches inside diameter and 10 feet long, and maintained at a temperature of approximately 410° F. during the spraying operation, the epoxy resin powder of the type and particle size described above is fed from hopper 1 into charging cylinder 4 at the rate of ½ pound per pipe sprayed. The charge is added by opening butterfly valve operated by control cylinder 5 and turning on the vibrators for a sufficient period to deliver the desired charge.

A dust chamber is used as shown in FIGS. 3 and 4 having a height of 14 inches and inside diameter of 10 inches with roof jets 43, 44 and 44' located about 1 inch from the top and the fluffing jets 41 and 42 reaching to about 1 inch from the bottom of the chamber. The collecting head 9 has a height of 6 inches and an inside diameter of 5 inches. The dust chamber has the arrangement and type of jets shown in FIGS. 3 and 4 with jet openings in 43' having a diameter of about 1/8 inch, the jet opening 63 in cap 44" having a diameter of 3/16 inch, and the slotted opening 64 in jet 42 being 1/4 inch long and 1/32 inch wide and the opening at the end of jet 41 having a diameter of 3/16 inch. The fluffing jets 41 and 42 are operated at a pressure of 20 p.s.i. and the roof jets 43 and 44 and 44' are operated at an air pressure of 30 p.s.i.

The lance has a length of 26 feet, and an inside diameter in the powder tube of 5/8 inch. The deflector tube has the desgn shown in FIG. 5 with a conical surface. The conical surface or angular section 55 makes an angle of 45° with the axis of the stem 47. The stem 47 has a diameter of 5/16 inch so that the distance between the inside surface of the powder tube and the outside surface of the stem is 5/32 inch.

The air jets 41, 44 and 44' are operated at intermittent or pulsating pressures whereas air jets 42 and 43 are operated at continuous pressures. Each of air jets 41, 44 and 44' is open for 1/3 of a second of each second with only one of these jets being open at the same time. Thus each jet is open ⅓ of the second and shut ⅔ of the second. A charge of ½ pound of epoxy resin powder is added to the dust chamber between each spraying operation.

The above spraying operation is carried out for a considerable period in coating the inside of several hundred pipe without requiring any adjustment in the various operating conditions. The resultant coatings have a thickness of approximately 8 mils, and are quite uniform in thickness and free of holidays.

When the above procedure is repeated using similar conditions with polyethylene powder or with any of the various other resins listed above, similar satisfactory results are obtained.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. Apparatus for applying a resin coating to the inside of pipe comprising:
   (a) a dust chamber adapted to store at the bottom thereof a supply of dust during operation of said apparatus and having a dust feed inlet and a dust-air stream outlet in an upper region thereof;
   (b) a plurality of air jets in said dust chamber adapted to maintain a cloud of resin dust in the upper region of said dust chamber and to deliver from said dust chamber a stream of air having said dust suspended therein, said air jets comprising at least one air jet in a lower region of said dust chamber and at least one air jet in an upper region of said dust chamber, both adapted to provide a steady flow of compressed air therethru, and also at least one air jet in a lower region of said dust chamber adapted to provide a pulsating flow of compressed air;
   (c) a means for feeding resin dust to said dust chamber;
   (d) a lance of considerable length having a powder tube in the inner portion thereof running the entire length thereof and adapted to receive said resin dust cloud from said dust chamber, said lance being adapted for relative movement into and out of the interior of said pipe which is to be coated with said resin powder;
   (e) a means for keeping said powder tube from becoming heated by radiation of heat from said pipe;
   (f) a spray nozzle attached to the exit end of said lance and adapted to deflect the resin particles of said resin dust cloud, emanating from said lance onto the interior surface of said pipe; and
   (g) a means for causing relative movement of said lance into and subsequently out of the inner region of said pipe in such a manner that said spray nozzle passes through the entire length of said pipe.

2. Apparatus of claim 1 in which a second smaller chamber is located adjacent to and connected to an upper part of said dust chamber adapted to receive said dust cloud from said dust chamber and deliver said dust cloud to said lance.

3. Apparatus of claim 2 in which said lower air jets in said lower region have their outlets spaced from the bottom of said chamber no higher than one-third the height of said dust chamber, and said air jet in said upper region has its outlet spaced from the top of said dust chamber no lower than one-half the height of said dust chamber.

4. Apparatus of claim 2 in which said deflecting means of said spray nozzle is a conical surface.

5. Apparatus of claim 2 in which said plurality of airjets also includes at least one airjet in the upper region of said dust chamber adapted to provide a pulsating flow of compressed air.

6. Apparatus of claim 5 in which said airjets providing pulsating flow are synchronized so that each of said pulsating airjets provides air flow when the other pulsating airjets are in a non-flow condition.

7. Apparatus of claim 2 in which said plurality of airjets comprises also at least two airjets in the upper region of said dust chamber adapted to provide a pulsating flow of compressed air.

8. Apparatus of claim 2 in which said plurality of airjets includes one airjet in said lower region and two airjets in said upper region each adapted to provide pulsating flow of compressed air.

9. Apparatus of claim 8 in which said pulsating airjets are synchronized so that each said pulsating airjet has its flow period when each of the other pulsating airjets is in a non-flow condition.

10. A dust chamber adapted to store a supply of dust in the bottom thereof and to deliver a cloud of resin dust suspended in an air stream comprising:
    (a) a chamber having a resin dust charging means;
    (b) an outlet means for said dust cloud located in the upper region of said dust chamber; and
    (c) a plurality of airjets in said dust chamber comprising at least one lower airjet having its outlet at a point no higher than one-third the height of said chamber and at least one upper airjet having its outlet at a point no lower than one-half the height of said dust chamber, both of said airjets being adapted to deliver a steady stream of compressed air into said dust chamber, and said plurality of airjets also comprising at least one jet in the lower region of said dust chamber adapted to provide a pulsating flow of air compressed.

11. A dust chamber of claim 10 in which said plurality of airjets comprises at least one airjet in the upper region of said chamber adapted to provide a pulsating flow of compressed air.

12. A dust chamber of claim 10 in which there are three airjets adapted to provide a pulsating flow of compressed air, one of said pulsating airjets being positioned in the lower region of said dust chamber and two of said pulsating airjets being positioned in the upper region of said dust chamber.

13. A dust chamber of claim 10 in which said dust chamber has a smaller chamber located adjacent to and connected with an upper region of said dust chamber, said smaller chamber being adapted to receive said dust cloud and to guide said dust cloud through said outlet means.

14. A process for the application of resin coating to the inside surface of pipe comprising the steps of:
    (a) depositing a charge of finely divided resin powder into a dust chamber equipped with a plurality of airjets and an air-dust outlet in the upper region thereof;
    (b) supplying compressed air in steady flow through at least one airjet outlet located in the lower region of said dust chamber and through at least one airjet outlet located in the upper region of said dust chamber, the air being fed into said lower region being supplied at a pressure of 10–30 lbs. per square inch and the pressure of said air being fed into the upper region of said dust chamber being supplied at a pressure of 10–60 lbs. per square inch;
    (c) supplying compressed air through an airjet outlet located in the lower region of said dust chamber with pulsating flow under a pressure of 10–30 lbs. per square inch;
    (d) passing the resulting cloud of dust from the upper region of said dust chamber into a lance of appropriate length having an inner passageway therethrough;
    (e) maintaining said passageway at a temperature less than will cause adherence of said powder thereto;

(f) directing the resin powder after it has passed through said lance onto the wall of said pipe; and (g) maintaining said pipe at a temperature suitable for causing softening and adherence of said resin to said inner wall, said resin dust being applied to said inside surface of said pipe, while said lance is being shifted in relative position with respect to said pipe from a position in which said lance occupies the full length of said pipe to another position in which said lance is completely withdrawn from said pipe.

15. A process of claim 14 in which compressed air is also supplied to said dust chamber through an airjet having its opening in an upper region of said dust chamber and said compressed air is delivered in pulsating flow at a pressure of 10–60 lbs. per square inch.

16. A process of claim 14 in which compressed air is supplied in pulsating flow at at least two points in the upper region of said dust chamber.

17. A process of claim 14 in which said upper air inlets introduce air into said chamber at a pressure of approximately 20 lbs. per square inch and said lower air inlets introduce air into said chamber at a pressure of approximately 30 lbs. per square inch.

18. A process of claim 14 in which said resin is an epoxy resin.

References Cited by the Examiner

UNITED STATES PATENTS

| | | | |
|---|---|---|---|
| 2,737,461 | 3/1956 | Huster et al. | 117—21 X |
| 2,800,875 | 7/1957 | Jewell | 118—306 |
| 2,850,324 | 9/1958 | Suess | 239—139 X |
| 2,873,716 | 2/1959 | Daniel et al. | 118—318 X |
| 2,919,160 | 12/1959 | Blackburn | 302—29 |
| 3,016,875 | 1/1962 | Ballentine et al. | 117—18 X |
| 3,034,729 | 5/1962 | Gray et al. | 118—306 X |
| 3,044,893 | 7/1962 | Heintz et al. | 117—18 |
| 3,153,599 | 10/1964 | Klein et al. | 117—18 |

FOREIGN PATENTS

| | | |
|---|---|---|
| 751,697 | 7/1956 | Great Britain. |

JOSEPH B. SPENCER, *Primary Examiner.*

RICHARD D. NEVIUS, *Examiner.*